Oct. 25, 1960  D. D. KOBBEMAN  2,957,309
ROCKET MOTOR
Filed July 22, 1957  2 Sheets-Sheet 1

INVENTOR.
D. D. KOBBEMAN
BY Hudson & Young
ATTORNEYS

Oct. 25, 1960   D. D. KOBBEMAN   2,957,309
ROCKET MOTOR
Filed July 22, 1957   2 Sheets-Sheet 2
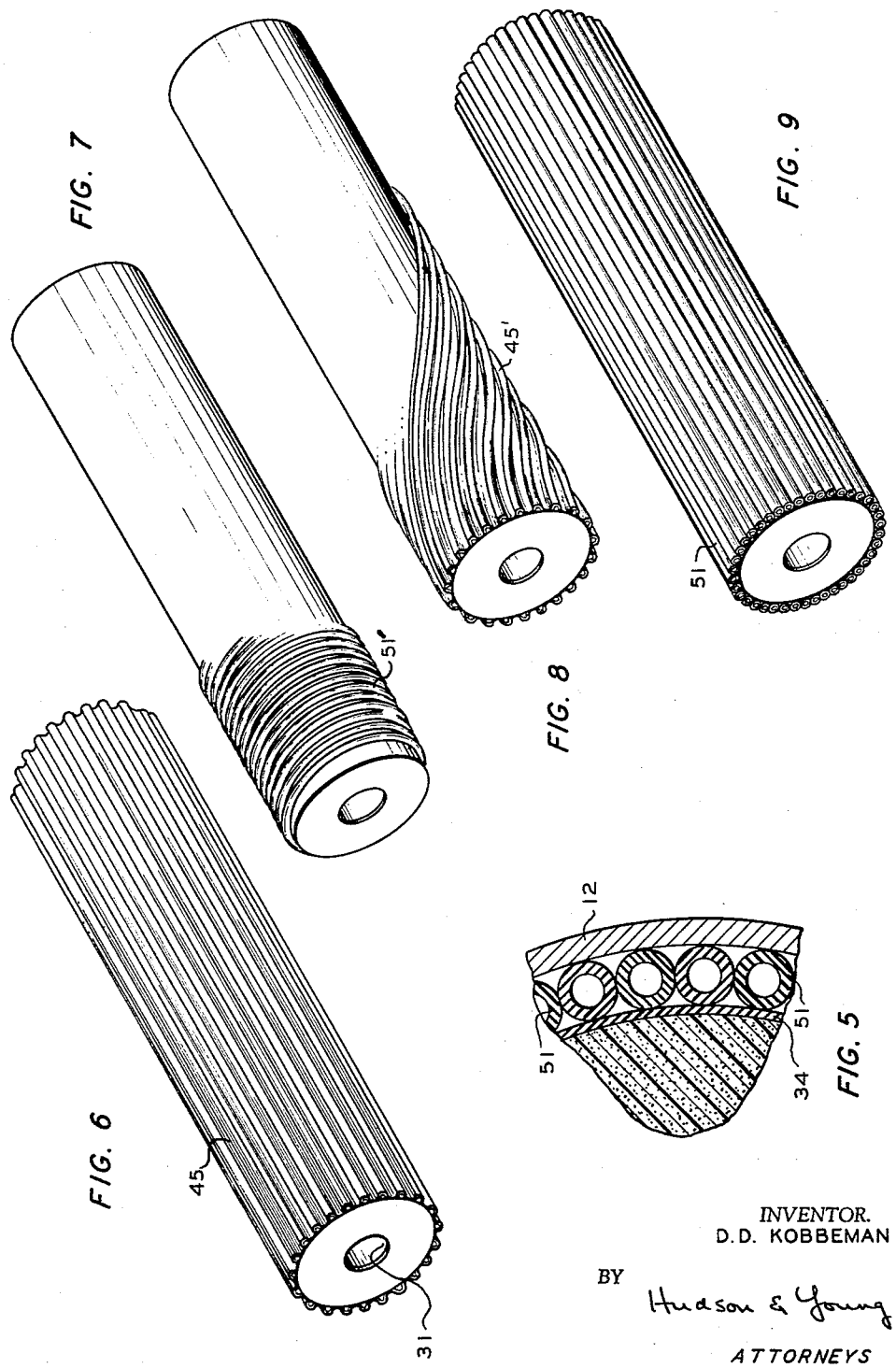
INVENTOR.
D. D. KOBBEMAN
BY Hudson & Young
ATTORNEYS United States Patent Office 2,957,309
Patented Oct. 25, 1960

2,957,309

ROCKET MOTOR

Donald D. Kobbeman, McGregor, Tex., assignor to Phillips Petroleum Company, a corporation of Delaware Filed July 22, 1957, Ser. No. 673,539

5 Claims. (Cl. 60—35.6)

This invention relates to rocket motors. More particularly, it relates to a rocket motor charged with a grain of solid propellant which is supported therein in a novel manner.

Rocket motors, such as the type with which this invention is concerned, generally comprise a cylindrical casing defining a combustion chamber loaded or charged with a grain of solid rocket propellant which, upon ignition and burning, generates large volumes of gases at high pressures and temperatures. These gaseous products are discharged from the combustion chamber at high velocity through an outlet nozzle located at the rear or aft end of the chamber, thus developing propulsive thrust which propels the rocket motor forward.

Rocket grains of solid propellant can be fabricated by casting or extrusion in cylindrical form. In order to achieve maximum loading of the rocket motor with propellant, the rocket grains are often bonded at their outer cylindrical surface to the inner wall of the rocket motor casing. However, this maximum loading is often achieved at the expense of desirable design parameters.

During storage or transportation of these case-bonded rocket motors, or when they are subjected to temperature-cycling to between −70° F. and +170° according to military specifications, the grains often undergo volume changes due to crystal modification of propellant constituents or merely due to thermal expansion or contraction, or both, induced by changes in ambient temperature. This is especially true of rocket motors charged with grains of propellant material of the composite type comprising an oxidant and fuel or binder wherein the oxidant is ammonium nitrate due to the fact that ammonium nitrate undergoes crystal modifications when certain changes in temperature occur. These changes in crystal structure often cause a reduction of the strength of the particles and are accompanied by measurable changes in volume. As such, rocket grains made of this type of propellant material often tend to pull away from the rocket motor casing and often cracking or breaking of the grain occurs because of the tensile stresses developed. This cracking tends to undesirably expose certain surfaces of the grain, on which surfaces uncontrolled burning may result with the consequent build-up of pressure within the combustion chamber of the rocket motor at a deleteriously excessive rate. The accelerated and uncontrolled combustion thereby resulting generates gases at an undue pressure build-up for a time shorter than that required for the necessary degree of maximum thrust. In the case of ammonium nitrate, ambient low temperatures may cause a large contraction of the rocket grain.

Rocket motors are often subjected to shocks and vibration during handling as well as during firing or operation. If the grain is not adequately supported in the rocket motor, the grain may tend to become loose and is likely to be subjected to free movement within the rocket motor. If the grain becomes loose, there is a possibility that it will collide with internal rocket motor hardware and become cracked or otherwise broken. Consequently, undesirable surfaces of the grain are exposed, thereby presenting the possibility of uncontrolled burning.

Accordingly, an object of this invention is to provide an improved rocket motor. Another object is to provide a charged rocket motor characterized by the reduced tendency of its propellant material to crack or break up due to volume changes, shocks, vibrations, and the like. A further object is to provide a charged rocket motor wherein the grain is supported in a novel manner so as to insulate the rocket motor casing. Further objects and advantages of my invention will become apparent to those skilled in the art from the following discussion, appended claims, and drawing in which:

Figures 4 and 5 are enlarged views similar to Figure 3 illustrating other embodiments of my invention; and Figures 6, 7, 8 and 9 are isometric views of various rocket grains embodying various modifications of my invention.

Figure 1:
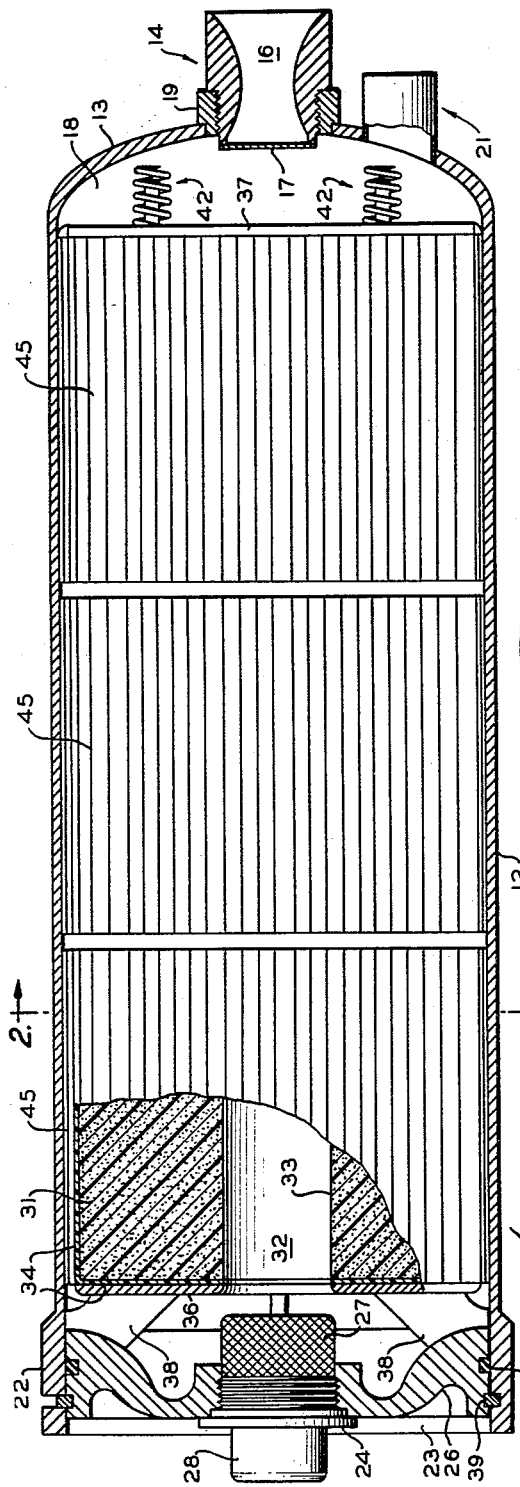
Figure 1 is an elevational view in partial section of a rocket motor illustrating aspects of my invention.

Referring now to the drawing, wherein like reference characters refer to like parts, and to Figure 1 in particular, a rocket motor generally designated 11 is shown and represents one form of a jet propulsion device which may be employed, for example, to assist the take-off of aircraft. Rocket motor 11 has a cylindrical casing 12 having a reduced rear or aft portion 13 which is provided with an axial opening in which an outlet nozzle device generally designated 14 is inserted.

Nozzle 14 is provided with a Venturi-type passage 16 across which is provided a blowout or starter disc 17 adapted to rupture or burst when a predetermined pressure is reached within the combustion chamber 18 of the rocket motor. Nozzle 14 can be made integral with casing portion 13, or can be made separable as shown and threadedly locked to casing portion 13 by a lock ring 19 or the like. The reduced casing portion 13 is preferably provided with a safety plug attachment generally designated 21 which is capable of releasing excessive pressure from the rocket motor, in a manner well known to those skilled in the art.

The other or head end of the casing 12 can be in the form of an enlarged portion 22 and this end of the casing closed by means of a closure member 23. The latter is provided with an axial opening in which an igniter plug 24 is inserted, the inner end of the latter being threadedly secured to a grain retaining assembly 26. The inner end of plug 24 is secured to a container 27, which is preferably in the form of a wire basket, the perforations of which have been covered with a thin layer of rubbery or plastic material which will readily burn or melt. Container 27 is loaded with suitable ignition material, preferably granular or pelleted igniter material such as disclosed and claimed in the copending application, Serial No. 592,995, filed June 21, 1956 by L. G. Herring. As disclosed in the latter mentioned application, the igniter composition is formed of a plurality of discreet particles or pellets each comprising a mixture of powdered metal, powdered oxidizing material and ethylcellulose as a binding agent. In addition, container 27 can also contain ignition sustaining material designed to furnish additional igniter decomposition products during the ignition period. This sustaining composition is preferably the same as that disclosed and claimed in U.S. application, Serial No. 591,340, filed June 14, 1956 by B. R. Adelman. As disclosed in the latter-mentioned application, the ignition sustaining composition generally comprises a mixture of an oxidant such as ammonium perchlorate or potassium perchlorate, a polysulfide polymer and finely divided metal such as aluminum, magnesium, or titanium. The ignition material within container 27 is in contact with suitable electro-responsive means, such as squibs or matches, which in turn can be readily connected to the electric circuit of an external power source upon removal of igniter cap 28.

Combustion chamber 18 is loaded with a solid rocket grain of propellant generally designated 31. This particular grain 31 is cylindrical in shape and has an outer diameter somewhat smaller than the inner diameter of the casing 12, so as to provide an annular space between casing 12 and grain 31. Grain 31 is of the internal-burning type by reason of an axial perforation 32 which defines an internal burning surface 33. The outer cylindrical surface and the two ends of grain 31 are covered with restricting material 34 which prevents propellant material from burning on the outer cylindrical surface and two ends. Retaining end plates 36 and 37 are attached to the ends of grain 31 adjacent the outer faces of the restricting material 34 attached to these ends. Plates 36 and 37 as well as the restricting material 34 adjacent thereto have axial openings therein which are in alignment with the perforation 32. Secured to the head retaining plate 36 are outer-extending prongs or legs 38 which are adapted to register with the grain retaining assembly 26, the latter being secured to the inside of the head end portion 22 of the casing 12 by key means 39 and sealing ring 41 or the like. The aft retaining plate 37 can have secured to its outer surface a plurality of spring means 42, such as prongs surrounded by compression springs, which are adapted to come into contact with the inside of reduced aft portion 13.

Figure 3:
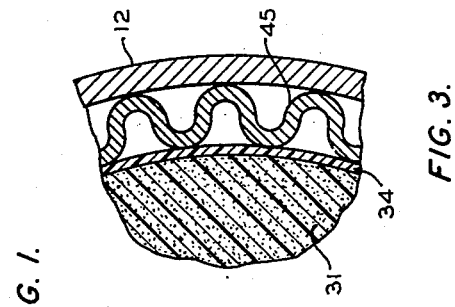
Figure 3 is an enlarged portion of Figure 2 illustrating certain details thereof.
Figure 2:
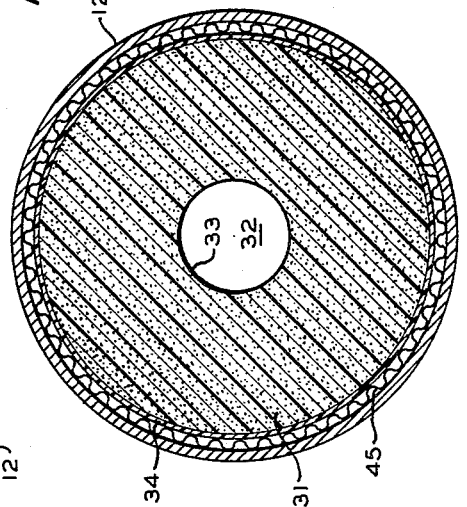
Figure 2 is an elevational cross-sectional view of Figure 1 taken along the plane indicated.

Although the rocket motor of Figure 1 illustrates a preferred embodiment of my invention, it is to be understood that my invention is not to be unduly limited thereto. The rocket motor can be charged with other grains of solid propellant having different configurations and burning surfaces. For example, the rocket motor can be charged with a grain of propellant of the end-burning type. Furthermore, a plurality of grains can be loaded in the rocket motor in a tandem manner. In place of the grain retaining assembly 26 and plates 36, 37, any other means may be employed to prevent longitudinal movement of the grain in the rocket motor. The structure described up to now is known in the art; the description of my novel means for suporting grains within a rocket motor will now be described, reference being made to Figures 1, 2, and 3.

Disposed in the annular space between the outer cylindrical surface of grain 31 and the inner cylindrical surface of casing 12 is resilient, duct-like means 45. Means 45 comprise one or more generally cylindrical sheets of corrugated material having alternating, parallel, equally curved ridges and hollows, the inner and outer extremities of which are preferably adhesively bonded in whole or in part to the outer restricting material 34 of grain 31 and the inner wall of casing 12, respectively, with any suitable adhesive or cement. Corrugated material 45, as illustrated in Figure 1, has its ridges and hollows oriented in a longitudinal manner with respect to the rocket motor. Corrugated material 45 may be made from a single piece of material, such as aluminum, or like resilient material, which can extend the length of grain 31, or, as shown, this corrugated material 45 can be made in sections. Although it is preferred to have corrugated material 45 in the form of a cylinder which completely surround the grain 31, it is within the scope of this invention to utilize only curved segments of corrugated material disposed in the annular space between the casing 12 and grain 31. The outer extremities of each duct or hollow is preferably sealed off to prevent hot gases from entering the same. Rocket motor 12 can be loaded or charged with the grain 31 previously bonded at its outer surface to the corrugated material 45. The grain 31 can also be press fitted or inserted in a cylindrical sheet of the corrugated material 45. When this manner of loading is employed, the rocket grain 31 will have the configuration illustrated in Figure 6. Alternatively, the corrugated material can be previously bonded to the inner wall of casing 12 and the grain 31 subsequently inserted therein by press fitting.

Figure 4:
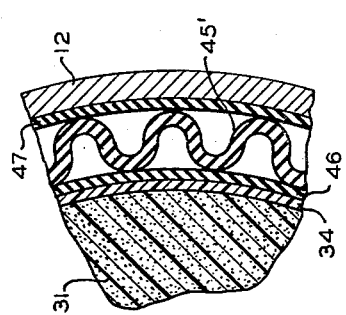

Referring to Figure 4, a further embodiment of my resilient duct-like means is shown comprising corrugated material 45' made of rubbery material, such as filled rubber or filled polyurethane, the inner and outer extremities of which are preferably bonded to similar rubbery laminate material 46, 47, the latter in turn being respectively bonded or otherwise fixed to the outer restricting material 34 of grain 31 and the inner wall of casing 12.

Referring to Figure 5, a further embodiment of my resilient duct-like means is shown comprising resilient tubes 51 made of rubber, plastic, or the like, which can be adhesively bonded or otherwise fixed to the contiguous surface of the restricting material 34 of the grain 31 and the inner wall of casing 12.

The duct-like means of my invention can be oriented with respect to the longitudinal axis of the rocket motor in various manners. As illustrated in Figure 6, the alternating ridges and grooves of the duct-like means 45 are in longitudinal alignment with the grain. In Figure 7, the duct-like means 51' is concentrically coiled or wound about the outer surface of the grain. In Figure 8, the duct-like means 45' is wound about the grain in a spiral manner. In Figure 9, the duct-like means 51 is in longitudinal alignment with the grain.

The use of the resilient duct-like means of my invention enables the rocket motor fabricator or manufacturer to obtain maximum loadings of propellant material with less likelihood that the propellant will crack or break up during storage, handling, or operation. Volume changes in the propellant material occasioned by changes in temperature will be effectively compensated for by the concurrent expansion or contraction of the resilient duct-like supporting means of this invention, without the undesirable exposure of propellant surfaces. As such, the rocket motors of this invention will operate more safely with assured attainment of predetermined thrust and ballistic characteristics. Moreover, the resilient duct-like means serves to insulate the rocket motor casing from the high temperatures of the gaseous products generated by the burning propellant and also serves to cushion the propellant when the rocket motor is subjected to shocks or vibrations.

The propellant material utilized in fabricating the rocket grains of this invention can be prepared from a variety of known compounding materials. The propellants can comprise the ammonium, alkali metal, and alkaline earth metal salts of nitric, perchloric and chloric acids and mixtures thereof. In addition, the propellants can comprise cordite, ballistite, double-base propellants such as a mixture of nitrocellulose and nitroglycerin, various oxidants dispersed in asphalt or polysulfide rubber binders, and the the like.

I prefer to employ composite type solid propellant mixtures comprising a major proportion of a solid oxidant such as ammonium nitrate or ammonium perchlorate and a minor proportion of a rubbery binder material such as a copolymer of a conjugated diene and a vinylpyridine or other substituted heterocyclic nitrogen base compound. Solid propellant mixtures of this nature and a process for their production are disclosed and claimed in copending application Serial No. 284,447, filed April 25, 1952, by W. B. Reynolds and J. E. Pritchard.

The preferred solid propellant compositions used in this invention can be prepared by mixing the copolymer with a solid oxidant, a burning rate catalyst, and various other compounding ingredients so that the reinforced binder forms a continuous phase and the oxidant a discontinuous phase. The resulting mixture can be heated to effect curing of the same.

The copolymers are preferably formed by copolymerization of a vinyl heterocyclic nitrogen compound with an open chain conjugated diene. The conjugated diene employed are those containing 4 to 6 carbon atoms per molecule and representatively include 1,3-butadiene; isoprene; 2,3-dimethyl-1,3-butadiene; and the like. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated diene employed is in the range between 75 and 95 parts by weight per 100 parts monomers and the vinyl heterocyclic nitrogen is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10–40, preferably in the range of 15 to 25, and may be masterbatched with 5–20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex Marasperse-CB, or similar surface active agent, is added to the carbon black slurry or to the water used to prepare the slurry.

The following empirical formulations or recipes generally represent the classes of binder and propellant compositions preferred for the preparation of the propellant grains of this invention.

Binder

| Ingredient: | Parts/100 parts rubber |
|---|---|
| Copolymer (Bd/MVP) | 100 |
| Philblack A (a carbon black) | 0–30 |
| Plasticizer | 10–30 |
| Silica | 0–20 |
| Metal oxide | 0–5 |
| Antioxidant | 0–5 |
| Wetting agent | 0–10 |
| Accelerator | 0–5 |
| Sulfur | 0–5 |

Propellant

| | |
|---|---|
| Oxidant (ammonium nitrate) | 90–75 weight percent. |
| Binder | 10–25 weight percent. |
| Burning rate catalyst | 0–30 parts/100 parts oxidant-binder. |

Suitable plasticizers useful in preparing these propellant grains include TP-90-B Poly-(butoxy ethoxy ethoxy) methane supplied by Thiokol Corp.; benzophenone; and Pentaryl A (monoamylbiphenyl). Suitable silica preparations include a 10–20 micron size range supplied by Davison Chemical Co.; and Hi-Sil 202, a rubber grade material supplied by Columbia-Southern Chemical Corp. A suitable antioxidant is Flexamine, a physical mixture containing 65 percent of a complex diarylamine-ketone reaction product and 35 percent of N,N'-diphenyl-p-phenylenediamine, supplied by Naugatuck Chemical Corp. A suitable wetting agent is Aerosol-OT (dioctyl sodium sulfosuccinate), supplied by American Cyanamide Co. Satisfactory rubber cure accelerators include Philcure 113 (SA-113 N,N-dimethyl-S-tertiary butylsulfenyl dithiocarbamate), supplied by Phillips Petroleum Co.; Butyl-8 (a dithiocarbamate-type rubber accelerator) supplied by R. T. Vanderbilt Co.; and GMF (quinone dioxime), supplied by Naugatuck Chemical Company. Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, and the like can also be used.

The layer of adhesive or restricting material can be made from any of the slow-burning materials used for this purpose for the rocket art, such as cellulose acetate, ethylcellulose, GRS, and preferably a butadiene-methylvinylpyridine copolymer. It should be understood that metal plates or the like can be used to restrict the ends of the grains, and the duct-like means of this invention serve to solely restrict the outer cylindrical surfaces of the grains without the necessity of using other restricting material.

Various modifications and alterations of my invention will become apparent to those skilled in the art without departing from the scope and spirit of my invention, and it is to be understood that the foregoing discussion and accompanying drawing merely represent preferred embodiments of my invention and do not unduly limit the same.

I claim:

1. In a rocket motor comprising a cylindrical tubular casing defining a combustion chamber, outlet nozzle means secured to one end of said casing and having a Venturi-like passage in axial communication with said chamber, said nozzle means adapted to permit the discharge of gaseous products from said chamber, and a cylindrical grain of propellant material disposed in said chamber, said propellant material comprising an oxidant and a rubber binder and normally susceptible to temperature-induced volume changes, said grain having an axial perforation defining an exposed burning surface, the outer cylindrical surface and two ends of said grain and the inner wall of said chamber adjacent said grain being covered with rubber restricting material, said grain and casing defining an annular space therebetween, the improvement comprising resilient duct-like means disposed within said annular space and adapted to expand and contract concurrently with said volume changes, said duct-like means consisting of a layer of corrugated rubber material having alternate, parallel, equally curved ridges and hollows, the extremities of said ridges being in contact with the corresponsingly adjacent restricting material covering said inner wall of said combustion chamber and the outer cylindrical surface of said grain.

2. A rocket motor according to claim 1 wherein said ridges and curves concentrically surround said grain.

3. A rocket motor according to claim 1 wherein said ridges and curves are arranged in longitudinal alignment in the said grain.

4. A rocket motor according to claim 1 wherein said ridges and curves are spirally arranged with respect to said grain.

5. In a rocket motor according to claim 1 wherein said propellant material comprises a major amount of ammonium nitrate as said oxidant and a minor aount of a copolyer of butadiene and methylvinylpyridine as said binder.

References Cited in the file of this patent

UNITED STATES PATENTS

| | | |
|---|---|---|
| 2,479,470 | Carr | Aug. 16, 1949 |
| 2,539,404 | Crutchfield et al. | Jan. 30, 1951 |
| 2,695,744 | Gattuso | Nov. 30, 1954 |
| 2,733,568 | Dickinson | Feb. 7, 1956 |